United States Patent
Kim et al.

(10) Patent No.: US 8,067,116 B2
(45) Date of Patent: Nov. 29, 2011

(54) HIGHLY REVERSIBLE LITHIUM INTERCALATING ELECTRODE ACTIVE MATERIAL, PREPARATION METHOD THEREOF, ELECTRODE AND SECONDARY BATTERY COMPRISING THE SAME

(75) Inventors: Ki-Tae Kim, Daejeon (KR); Min-Gyu Kim, Gyeongsangbuk-do (KR); Jae-Phil Cho, Gyeonggi-do (KR); Soon-Ho Ahn, Daejeon (KR); Seo-Jae Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/310,602

(22) PCT Filed: Aug. 23, 2007

(86) PCT No.: PCT/KR2007/004041
§ 371 (c)(1),
(2), (4) Date: Sep. 14, 2010

(87) PCT Pub. No.: WO2008/023944
PCT Pub. Date: Feb. 28, 2008

(65) Prior Publication Data
US 2011/0006253 A1  Jan. 13, 2011

(30) Foreign Application Priority Data
Aug. 25, 2006 (KR) .................. 10-2006-0081303

(51) Int. Cl.
*H01M 4/136* (2010.01)
*H01M 4/58* (2010.01)
*H01B 1/02* (2006.01)
*C01B 25/37* (2006.01)

(52) U.S. Cl. ............ 429/218.1; 429/209; 429/217; 429/231.7; 429/231.8; 252/519.14; 252/520.1; 423/305; 423/299; 204/280

(58) Field of Classification Search .......... 429/209, 429/217, 218.1, 231.7, 231.8; 252/519.14, 252/520.1; 204/280; 423/29, 299, 305
See application file for complete search history.

(56) References Cited

U.S. PATENT DOCUMENTS 3,922,553 A * 11/1975 Bachmann et al. ...... 250/370.12
(Continued)

FOREIGN PATENT DOCUMENTS

JP 2005-294245 10/2005
(Continued)

OTHER PUBLICATIONS

Article entitled: "The Synthesis, Structure, and Superconducting Properties of New-Pressure Forms of Tin Phosphide", by P.C. Donohue; taken from New High-Pressure Forms of SnP, vol. 9, No. 2, Feb. 1970.*

(Continued)

*Primary Examiner* — Joseph D Anthony
(74) *Attorney, Agent, or Firm* — Lerner, David, Littenberg, Krumholz & Mentlik, LLP

(57) ABSTRACT

Disclosed are an electrode active material, having a composition of $SnP_x$ ($0.9 \leq x \leq 0.98$), an electrode comprising the same, and a lithium secondary battery comprising the electrode. Also disclosed is a method for preparing an electrode active material having a composition of $SnP_x$ ($0.9 \leq x \leq 0.98$), the method comprising the steps of: preparing a mixed solution of a Sn precursor, trioctyl phosphine (TOP) and trioctyl phosphine oxide (TOPO); and heating the solution. The application of the teardrop-shaped single-crystal SnP0-94 particles as an anode active material for lithium secondary batteries can provide an anode having very excellent cycling properties because the active material has a reversible capacity, which is about two times as large as that of a carbon anode, along with a very low irreversible capacity, and it is structurally very stable against Li ion intercalation/deintercalation in a charge/discharge process, indicating little or no change in the volume thereof.

16 Claims, 8 Drawing Sheets

U.S. PATENT DOCUMENTS

| | | | | |
|---|---|---|---|---|
| 4,311,728 A | * | 1/1982 | Sansregret | 427/74 |
| 5,707,756 A | * | 1/1998 | Inoue et al. | 429/57 |
| 6,156,459 A | * | 12/2000 | Negoro et al. | 429/322 |
| 6,992,317 B2 | * | 1/2006 | Jain et al. | 257/14 |
| 2009/0202914 A1 | * | 8/2009 | Kepler et al. | 429/231.95 |

FOREIGN PATENT DOCUMENTS

| | | |
|---|---|---|
| KR | 1020060071555 | 6/2006 |

OTHER PUBLICATIONS

Zhou, et al., "Superior High Rate Capability Of Tin Phosphide Used As High Capacity Anode For Aqueous Primary Batteries", Electrochemistry Communications 8, pp. 55-59, 2006.

Kim, et al., "Enhancement of Capacity and Cycle-Life of $Sn_{4-\delta}P_3$ ($0 \leq \delta \leq 1$) Anode For Lithium Secondary Batteries", Journal of Power Sources 141, pp. 163-166, 2005.

* cited by examiner

HIGHLY REVERSIBLE LITHIUM INTERCALATING ELECTRODE ACTIVE MATERIAL, PREPARATION METHOD THEREOF, ELECTRODE AND SECONDARY BATTERY COMPRISING THE SAME

CROSS REFERENCE TO RELATED APPLICATIONS

The present application is a national phase entry under 35 U.S.C. §371 of International Application No. PCT/KR2007/004041, filed Aug. 23, 2007, published in English, which claims the benefit of Korean Patent Application No. 10-2006-0081303, filed Aug. 25, 2006. The disclosures of said applications are incorporated by reference herein.

TECHNICAL FIELD

The present invention relates to a highly reversible, lithium-intercalating electrode active material, a preparation method thereof, an electrode comprising the active material, and a secondary battery comprising the electrode, and more particularly to an anode active material, which has a composition of $SnP_{0.94}$, is in the form of teardrop-shaped particles, and has excellent cycling properties because it has a large reversible capacity and is not structurally changed during lithium intercalation.

BACKGROUND ART

In the development of high-capacity lithium secondary batteries, since amorphous tin-based composite oxide having a theoretical gravimetric capacity more than 2 times that of carbon (372 mAh/g) was suggested as an anode active material in the year 1997, many studies have been focused on lithium-reactive metals and metal oxides, for example, Sn, Si, $SnO_2$ and $Sn_2P_2O_7$, due to their high capacities and relatively low average working potentials (<1.51V). However, such materials have several serious problems in their practical application to lithium secondary batteries.

One of such problems is that these materials have a very low reversible capacity. Specifically, a capacity loss of more than 40% occurs after the first charge/discharge cycle because of the formation of an inactive matrix phase in the lithium phase (e.g., $Li_2O$) and strong side reactions with an electrolyte after the first cycle.

Another problem in practical application is that these materials undergo a very high volume change due to the formation of $Li_xM$ and M phases during charge/discharge cycles. As a result, active material particles are pulverized, so that they are separated from a current collector, thus causing electrical isolation.

Recently, metal phosphides (MPs) have been suggested as one of the most promising electrode materials. These materials have average working potentials higher than that of Sn, Si or $SnO_2$, but are characterized in that they can react reversibly with Li at an average voltage of 1V.

According to the nature of the metal, reactions involving metal phosphides $MP_n$ and lithium can be classified into two groups:
 (1) Li intercalation
 $MP_n \leftrightarrow Li_xMP_n$
 (2) metallization or metal alloying
 $MP_n \leftrightarrow M(Li_xM)+Li_xP$ $MnP_4$ is included in the first group, in which lithium intercalation occurs due to electrochemical redox processes ($MnP_4 \leftrightarrow Li_7MnP_4$). Also, the P—P bonds in $MnP_4$ are cleaved during lithium intercalation to form $Li_7MnP_4$. The formed $Li_7MnP_4$ is reoxidized to $MnP_4$ only between 0.57 V and 1.7 V, and on the other hand, $Li_7MnP_4$ is decomposed into Mn and $Li_3P$ below 0.5V.

Even though electrodes comprising $MnP_4$ were cycled in a limited voltage window, they showed a rapid capacity fading from 700 mAh/g to 350 mAh/g during initial several cycles and were stabilized after 50 cycles. A recent study conducted by Gillot et al. suggested that the reason for poor capacity retention in $MnP_4$ is because $Li_7MnP_4$ is irreversibly decomposed to $Li_3P$ and Mn, instead of recrystallization of $Li_7MnP_4$ to $MnP_4$.

Similarly, $MP_n$ compounds, such as $CoP_3$, $Cu_3P$, $VP_4$ or $Sn_3P_4$ also showed decomposition reactions similar to the above reaction. Such materials also have problems of 1) particle pulverization caused by large volume changes, and 2) fast capacity fading because of the formation of low-conductive LiP from $Li_3P$ at 0.65 V or more.

Meanwhile, tin phosphides, such as SnP, $SnP_3$ or $Sn_4P_3$ were also reported in prior literature. Such materials can be prepared by thermally treating stiochiometric amounts of tin and red phosphorus at high temperatures according to a conventional solid-phase reaction method. Recently, a technique of preparing nanometer-size $Sn_4P_3$ from tin and red phosphorus using a mechanical milling method has also be suggested.

DISCLOSURE OF THE INVENTION

An anode active material for lithium secondary batteries must satisfy the following standards: 1) low average working voltage (below 0.7V); 2) low irreversible capacity (no capacity fading); 3) high reversible capacity (larger than 700 mAh/g); and 4) excellent life-cycle performance. In particular, an anode active material showing a low volume change comparable to graphite (<15%) during charge/discharge cycles is needed.

The present inventors have found that teardrop-shaped single-crystal $SnP_{0.94}$ particles as an anode active material for lithium secondary batteries have very excellent cycling properties because they have a reversible capacity, which is about two times that of a carbon anode, along with a very low irreversible capacity, and they are structurally very stable against the intercalation/deintercalation of lithium ions during a charge/discharge process, indicating little or no change in the volume thereof.

Therefore, it is an object of the present invention to provide an electrode active material having a composition of $SnP_{0.94}$, a preparation method thereof, an electrode comprising the active material, and a lithium secondary battery comprising the electrode.

To achieve the above object, according to one aspect of the present invention, there is provided an electrode active material having a composition of $SnP_x$ ($0.9 \leq x \leq 0.98$).

According to another aspect of the present invention, there is provided a method for preparing an electrode active material having a composition of $SnP_x$ ($0.9 \leq x \leq 0.98$), the method comprising the steps of: preparing a mixed solution of a tin (Sn) precursor, trioctyl phosphine (TOP) and trioctyl phosphine oxide (TOPO); and heating the solution.

According to still another aspect of the present invention, there are provided an electrode, comprising said electrode active material, and a lithium secondary battery comprising said electrode.

Hereinafter, the present invention will be described in detail.

The electrode active material according to the present invention is characterized in that it has a composition of $SnP_{0.94}$ and consists of teardrop-shaped single-crystal particles. However, because defects can exist even in single crystals, the composition of the electrode active material according to the present invention may be $SnP_x$ ($0.9 \leq x \leq 0.98$).

The $SnP_{0.94}$ anode active material of the present invention can have very excellent cycling properties because the reversible capacity thereof is very high, the initial discharge efficiency is high, and the initial Coulombic efficiency is high, and the change in volume caused by charge/discharge cycles is small.

The electrode active material of the present invention is based on a hexagonal crystal structure and may be obtained by selective anisotropic growth of crystals along the c-axis of the hexagonal crystal lattice. Particularly, the long-axis connecting the tail portion with the head portion of the teardrop shape of the active material particles may be the c-axis of the hexagonal crystal lattice, and the active material of the present invention may have a crystal structure as shown in Table 1.

TABLE 1

| | UNIT CELL | | a = 4.3917 Å, c = 6.0408 Å (a = 4.39 Å, c = 6.04 Å)* 90.0° 90.0° 120.0° | |
|---|---|---|---|---|
| | SPACE GROUP | | P –3 m 1 | |
| Atom | # | SITE | X | Y | Z |
| Sn | | 2d | 0.3333 (0.3333) | 0.6667 (0.6667) | 0.30019 (0.3025(2)) |
| P | (1) | 2c | 0 (0) | 0 (0) | 0.1811 (0.185(2)) |
| P | (2) | 6i | 0.8583 (0.863(1)) | 0.1417 (0.137(1)) | 0.0497 (0.054(1)) |

*The crystallographic structural values obtained from reference written below.
Y. Kim, B. W. Cho, H. Sohn. J. Electrochem. Soc. 2005, 152, A1475

As can be seen in Table 1 above, the crystal structure of the electrode active material has a hexagonal layered crystal structure, in which tin atoms are hexagonally packed in the unit cell and closely linked with two kinds of diphosphorus atomic pairs, and the layered slab consists of a polymeric network of —[Sn—P—P—Sn]— that exhibits zigzag bonding (see FIGS. 6 to 8).

The electrode active material particles of the present invention is teardrop-shaped (see FIG. 1), and may have a length ranging from 100 nm to 1 μm and an aspect ratio (long-axis length/short-axis length) of 1.0-10.0.

The electrode active material of the present invention is characterized in that it can undergo reversible lithium intercalation/deintercalation in a charge/discharge process, and particularly, there is no change in the crystal structure thereof, even by the intercalation/deintercalation of lithium. This is because there is no change in the oxidation state of Sn, even by the reversible intercalation/deintercalation of lithium, and charge compensation occurs due to local structural variation around Sn ions. Thus, there is little or no change in the crystal structure and volume of the electrode active material according to the present invention because lithium is located in the interlayer interstitial sites of the crystal lattice during charging, unlike other anode active materials based on metal phosphides.

The electrode active material of the present invention may have a capacity of 600-900 mAh/g, and preferably 740 mAh/g, at 0-1.2 V. Particularly, due to the above-described crystal structure and lithium intercalation characteristics, the electrode active material may have a capacity retention of more than 90% after 40 cycles, and a Coulombic efficiency of more than 80% in the first charge/discharge cycle.

The inventive electrode active material having a composition of $SnP_x$ ($0.9 \leq x \leq 0.98$) can be prepared through a method comprising the steps of: a) preparing a mixed solution of a tin (Sn) precursor, trioctylphosphin (TOP) and trioctylphosphin oxide (TOPO); and b) heating the solution.

As the Sn precursor, it is preferable to use tin acetate ($Sn(C_2H_3O_2)_2$), but the scope of the present invention is not limited thereto, and materials in the form of other salts containing Sn may also be used in the present invention.

TOP and TOPO are known as capping agents that promote the selective anisotropic growth of nanocrystals by changing crystallographic surface energy. It is known that several different shapes of metal phosphide nanoparticles, such as nanospheres, nanorods and nanowires, may be formed by controlling the amount and ratio of TOP/TOPO.

In the case of the present invention, a TOP-Sn complex could not be formed due to the low solubility of tin acetate in TOP. Instead, tin phosphide particles could be obtained by mixing tin acetate, TOP and TOPO with each other and heating the mixture at 300-450° C. for 10 min to 5 hr. Preferably, uniform teardrop-shaped tin phosphide particles could be obtained by heating the mixture at 390° C. for 1 hr according to the solution-based thermal decomposition method (see FIG. 1a).

[Fabrication of Electrode and Secondary Battery]

An electrode comprising, as an electrode active material, the $SnP_{0.94}$ powder disclosed in the present invention, can be prepared according to a method known to those skilled in the art. For example, the electrode may comprise, in addition to the active material according to the present invention, a conductive agent for giving electrical conductivity and a binder allowing the adhesion between the active material and a current collector.

In non-limiting example, a laminated electrode structure can be fabricated by mixing 1-30 wt % of a conductive agent and 1-10 wt % of a binder with the electrode active material prepared according to the above-described method, adding the mixture to a dispersing agent, stirring the solution to prepare a paste, and applying the paste on a charge collector made of metal material, followed by compressing and drying.

As the conductive agent, carbon black is generally used. Currently commercially available carbon black products include acetylene black (Chevron Chemical Company or Gulf Oil Company), Ketjen Black EC (Armak Company), Vulcan XC-72 (Cabot Company) and Super P (MMM Co.).

Typical examples of the binder include polytetrafluoroethylene (PTFE), polyvinylidene fluoride (PVdF) or copolymers thereof, and celluloses. Typical examples of the dispersing agent include isopropyl alcohol, N-methylpyrrolidone (NMP), and acetone.

As the current collector made of metal material, any metal may be used, as long as it is a metal to which the paste can readily adhere, and which is highly conductive, not reactive in the voltage range of the battery. Non-limiting examples thereof include meshes and foils made of aluminum, copper or stainless steel.

In another aspect, the present invention provides a secondary battery comprising said electrode of the present invention. The secondary battery of the present invention can be fabricated using any method known in the art, which is not specifically limited. For example, the secondary battery can be fabricated by interposing a separator between a cathode and an anode to form an assembly and injecting a non-aqueous electrolyte into the assembly. Also, as the electrodes, the separator and the non-aqueous electrolyte and, if necessary, other additives, those known in the art may be used.

Moreover, a porous separator can be used as the separator in the fabrication of the inventive battery. Examples thereof include, but are not limited to, polypropylene-based, polyethylene-based or polyolefin-based porous separators.

A non-aqueous electrolyte, which can be used in the secondary battery of the present invention, may contain cyclic carbonates and/or linear carbonates. Non-limiting examples of the cyclic carbonates include ethylene carbonate (EC), propylene carbonate (PC) and gamma-butyrolactone (GBL). Non-limiting examples of the linear carbonates include diethyl carbonate (DEC), dimethyl carbonate (DMC), ethyl, methyl carbonate (EMC) and methyl propyl carbonate (MPC). Also, the non-aqueous electrolyte for use in the secondary battery of the present invention contains a lithium salt together with said carbonate compounds. Specific examples of the lithium salt include $LiClO_4$, $LiCF_3SO_3$, $LiPF_6$, $LiBF_4$, $LiAsF_6$ and $LiN(CF_3SO_2)_2$.

BRIEF DESCRIPTION OF THE DRAWINGS

In FIG. 1, (a) and (b) are TEM (Transmission Electron Microscopy) photographs of said particles, (c) is an SAED (Selected Area Electron Diffraction) pattern of the tail portion of said particles, (d) is an SAED pattern of the head portion of said particles, and (e) is an HRTEM (High Resolution TEM) photograph of the cross-section of the tail portion of said particles. As indicated by arrows in FIG. 1, stacking faults appear as streaky extra spots in the SAED pattern and as thin platelets in the HRTEM photograph.

In FIG. 3(a), the numerals in parentheses indicate the points at which XRD (X-ray Diffraction) analysis in 3(b) and XAS (X-ray Absorption spectra) analysis in FIG. 4 were conducted.

MODE FOR CARRYING OUT THE INVENTION

Hereinafter, the present invention will be described in further detail with reference to examples and comparative examples. However, it is to be understood that these examples are for illustrative purposes only, and the scope of the present invention is not limited thereto.

Example 1

The synthesis of $SnP_{0.94}$ was based on the reaction of tin acetate ($Sn(C_2H_3O_2)_2$) in a high-temperature solution of trioctyl phosphine ($CH_3(CH_2)_7]_3P$; hereinafter, referred to as "TOP") and trioctylphosphine oxide ($CH_3(CH_2)_7]_3PO$); hereinafter, referred to as TOPO). Specifically, instead of injecting a TOP-Sn complex into a TOPO solution, 0.36 g of tin acetate, 10 ml of TOP and 5 g of TOPO were mixed with each other and heated at 390° C. for 1 hr. During the heating process, it could be observed that smoke was generated and the color of the solution changed to black.

The resulting black mixture was cooled to room temperature, and 50 mL of ethanol was added thereto to form a black precipitate. The precipitate was isolated by centrifugation (at 5000 rpm for 15 min) and washed two times with 50 mL of ethanol to remove any excess of TOP and TOPO.

The resulting precipitate was dried in a vacuum to obtain powder. All the reactions were carried out in a dry argon atmosphere (less than 10 ppm $O_2$ and $H_2O$).

A coin-type half-battery comprising said powder as an anode active material was fabricated. The electrode consisted of 80 wt % of the active material, 10 wt % of Super P carbon black and 10 wt % of PVDF (polyvinylidene fluoride), and a mixture of ethylene carbonate (EC) and diethylene carbonate (DEC), containing 1M $LiPF_6$ salt, was used as an electrolyte.

The fabricated half-battery was cycled at a rate of 0.2 C (120 mA/g) between 0 and 1.2 V, and the characteristics thereof were measured.

The preparation of samples for XASF measurements was carried out in an inert gas-filled glove box in order to prevent any oxidation or contamination. The discharged and charged $SnP_{0.94}$ particles were separated from the electrode and sealed with a polyimide tape (KAPTON-500H, 125 µm thickness).

Sn $L_{III}$-edges X-ray absorption spectra were recorded on the BL7C1 beam line of the Pohang light source (PLS) with a ring current of 120-170 mA at 2.5 GeV.

A Si (111) double-crystal monochromator was used to the monochromatize X-ray photon energy. The data was collected in transmission mode using He(50%)+$N_2$(50%) gas-filled ionization chambers as detectors. Higher-order harmonic contamination occurring in the XAS experiments was eliminated by detuning to reduce the incident X-ray intensity by about 40%. Energy calibration was performed using standard Sn metal powder. The data reduction of the measured spectra was performed by the standard procedure reported in the prior art.

Consideration

Figure 1:
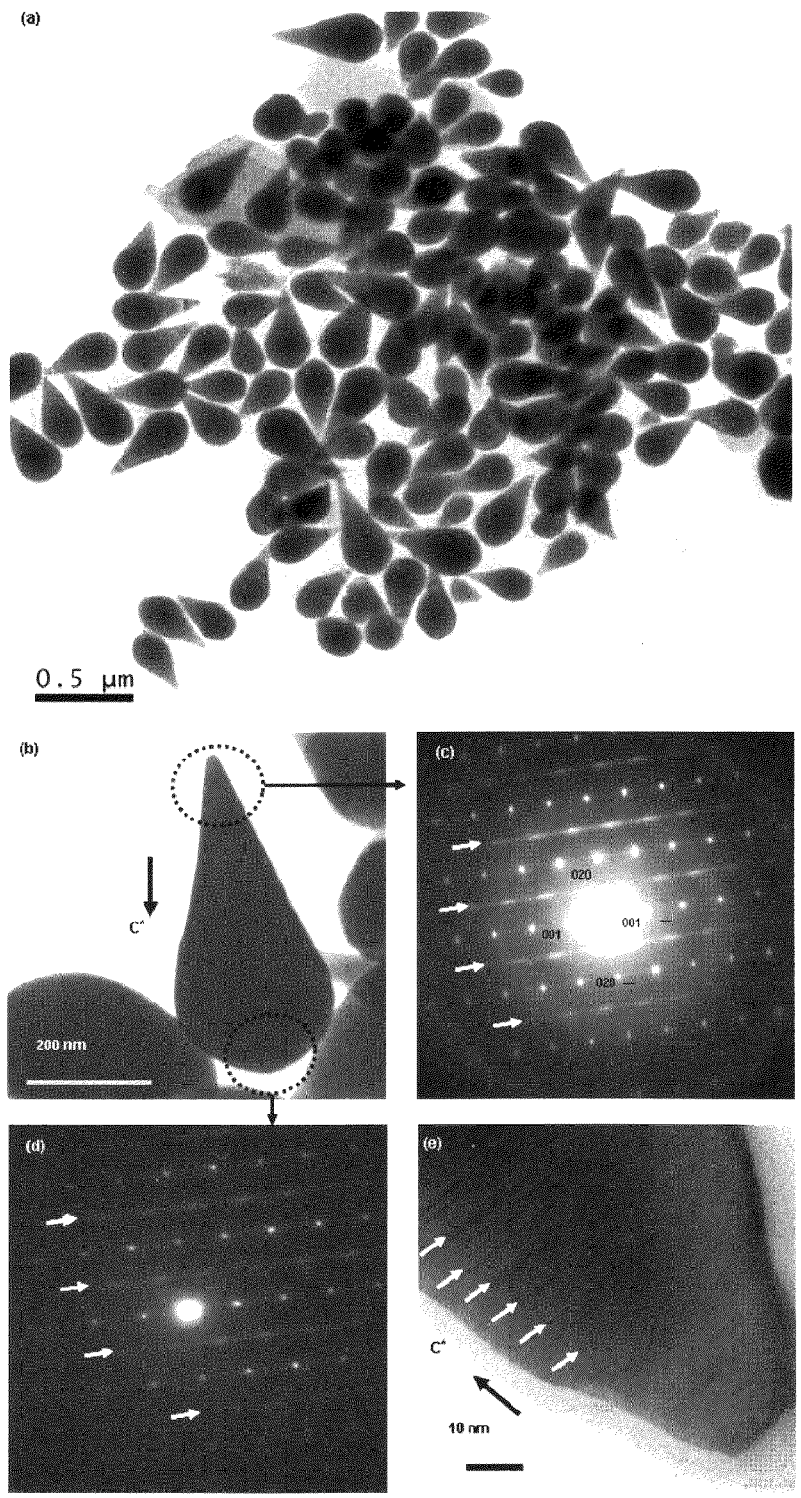
FIG. 1 shows TEM analysis results for teardrop-shaped $SnP_{0.94}$ particles prepared according to Example 1.

FIGS. 1a and 1b shows TEM images of tin phosphide prepared from a mixed solution of TOP and TOPO by a thermal decomposition method according to Example 1.

FIGS. 1c and 1d show selected area electron diffraction (SAED) patterns taken from the head and tail portions of the teardrop-shaped particles, respectively. As can be seen in FIGS. 1c and 1d, bright diffraction spots are clearly visible, suggesting the well-developed crystallinity of the particles. Such patterns are essentially identical over the entire teardrop-shaped particles, indicating that each particle is a single crystal of $SnP_{0.94}$. The SAED patterns were indexed to the [011] zone of the hexagonal lattice, and such results agree with the XRD results. The SAED patterns also indicate that the c-axis of the hexagonal lattice is aligned in the longitudinal direction of the particles, suggesting that the preferential growth direction is along the c-axis.

All the examined particles showed similar observation results. Furthermore, the diffraction patterns contain forbidden streaked peaks (indicated by arrows in the figures), which are probably due to the presence of thin platelets of stacking faults in the c-direction.

In a high-resolution TEM (HRTEM) image of the tail section of the particles, thin plates of stacking faults were indeed observed (indicated by white arrows in FIG. 1(e)).

Figure 2:
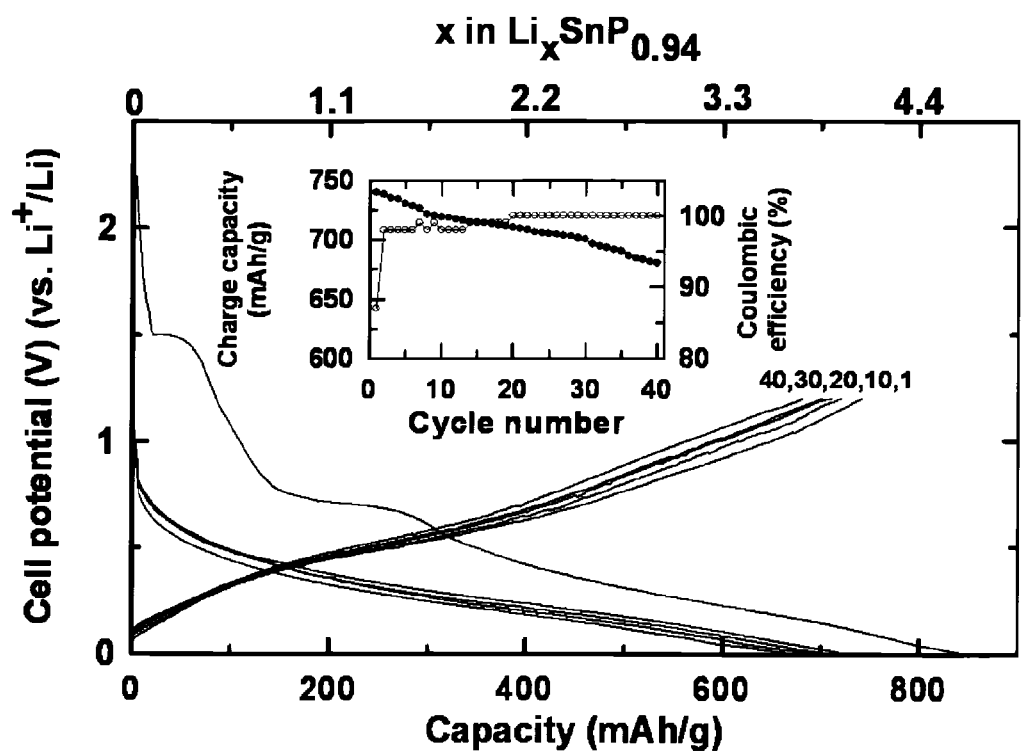
FIG. 2 shows potential profiles of the 1, 10, 20, 30 and 40 cycles of a coin-type half cell prepared according to Example 1. between 0V and 1.2V at a rate of 0.2 C (120 mA/g). The inset of FIG. 2 shows the charge capacity versus Coulombic efficiency of said half cell up to 40 cycles.

FIG. 2 shows voltage profiles of $1^{st}$, $10^{th}$, $20^{th}$, $30^{th}$ and $40^{th}$ cycles of $SnP_{0.94}$ at a current rate of 0.2 C (120 mA/g) between 1.2V and 0V.

The first discharge and charge capacities were 850 and 740 mAh/g, respectively, indicating a Coulombic efficiency of 87%. However, as can be seen in the inset of FIG. 2, the Coulombic efficiency after 2 cycles was 98%, and fully recovered to 100% after 200 cycles. The capacity retention after 40 cycles was 92% of the first charge capacity.

This value is far superior to that previously reported for the $MnP_4$ anode, which showed a capacity that rapidly decreased to 350 mAh/g after a few cycles.

Figure 3:
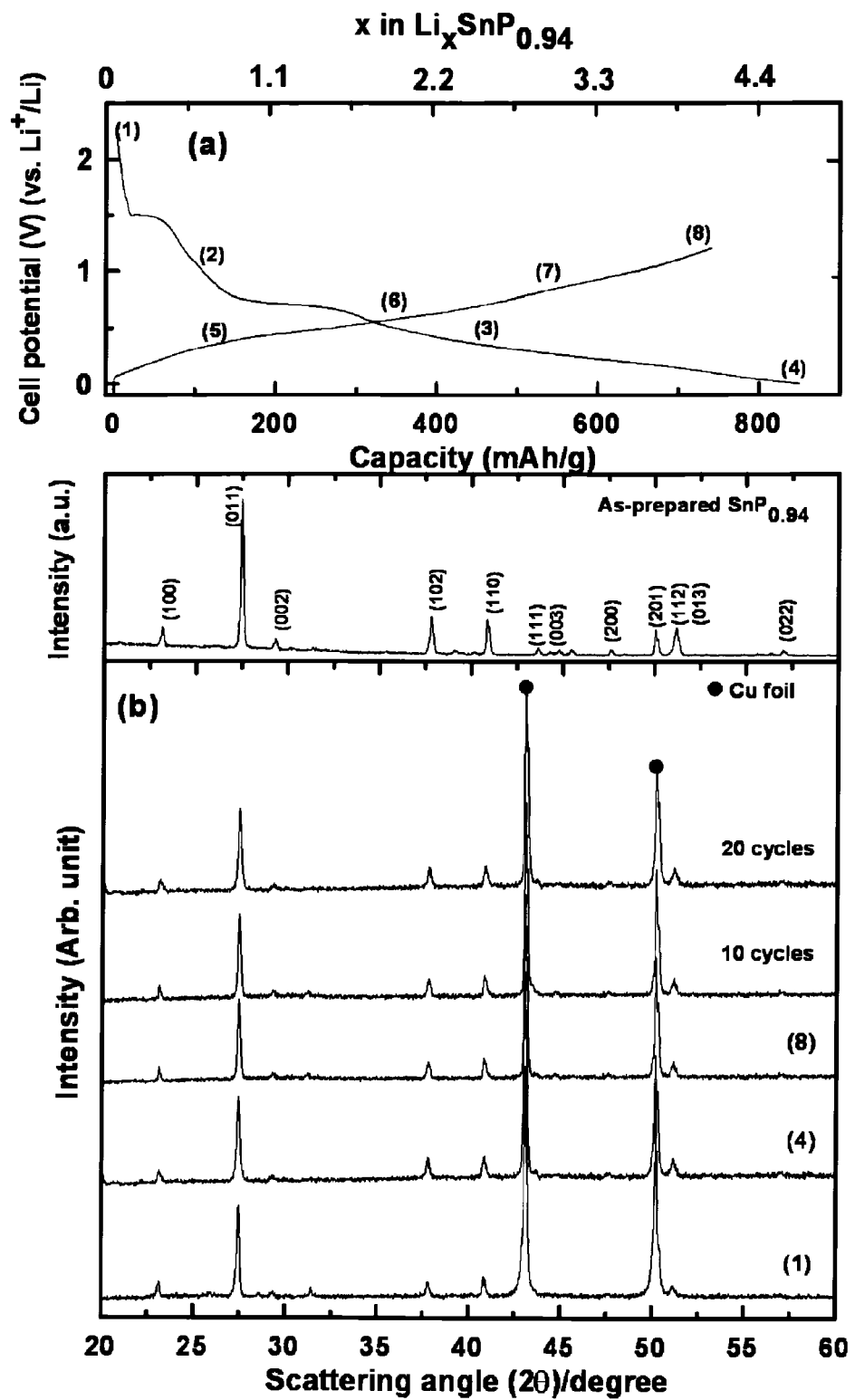
FIG. 3(a) shows potential profiles between 0V and 1.2V for a coin-type half cell prepared according to Example 1.
FIG. 3(b) depicts powder XRD patterns of $SnP_{0.94}$ particles, after particle synthesis (as-prepared), immediately before discharging to point (1), after fully discharging to 0V and 1.2V (corresponding to points (4) and (8)), and after 10 cycles and 20 cycles (full discharge to 0V), respectively.
Figure 6:
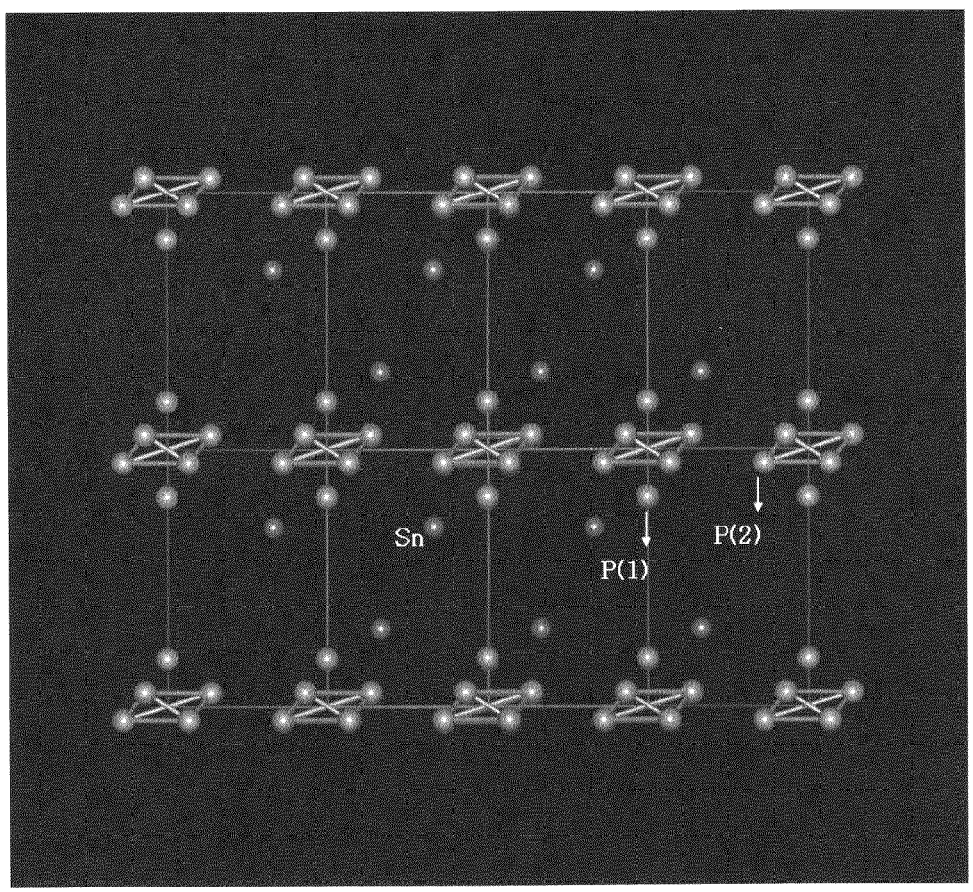
FIG. 6 shows the crystal structure of $SnP_{0.94}$.
Figure 7:
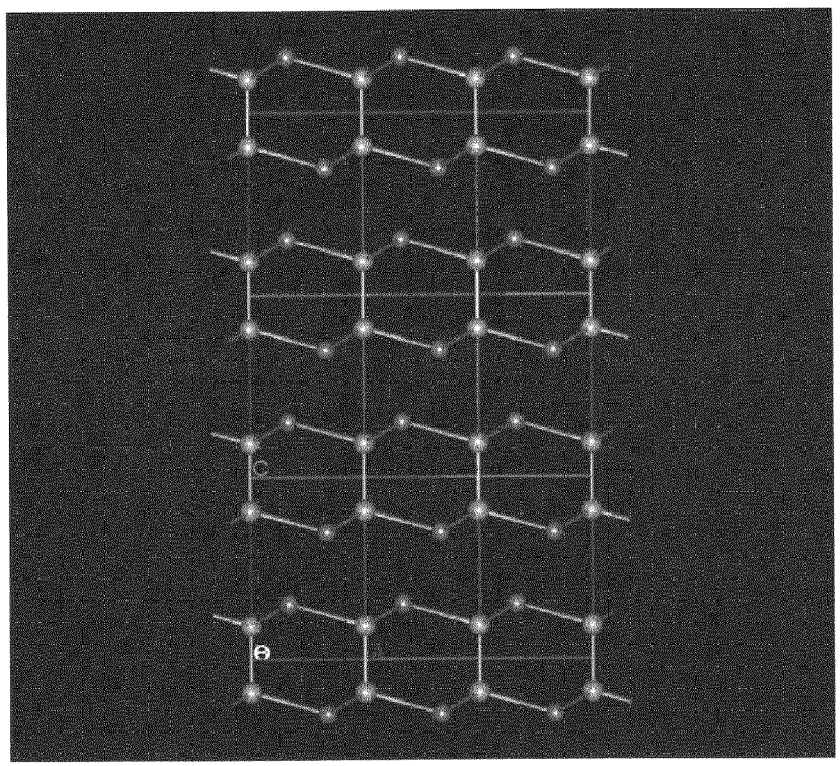
FIG. 7 shows the crystal structure of $SnP_{0.94}$ having a polymeric network of Sn and P1 atoms.
Figure 7:
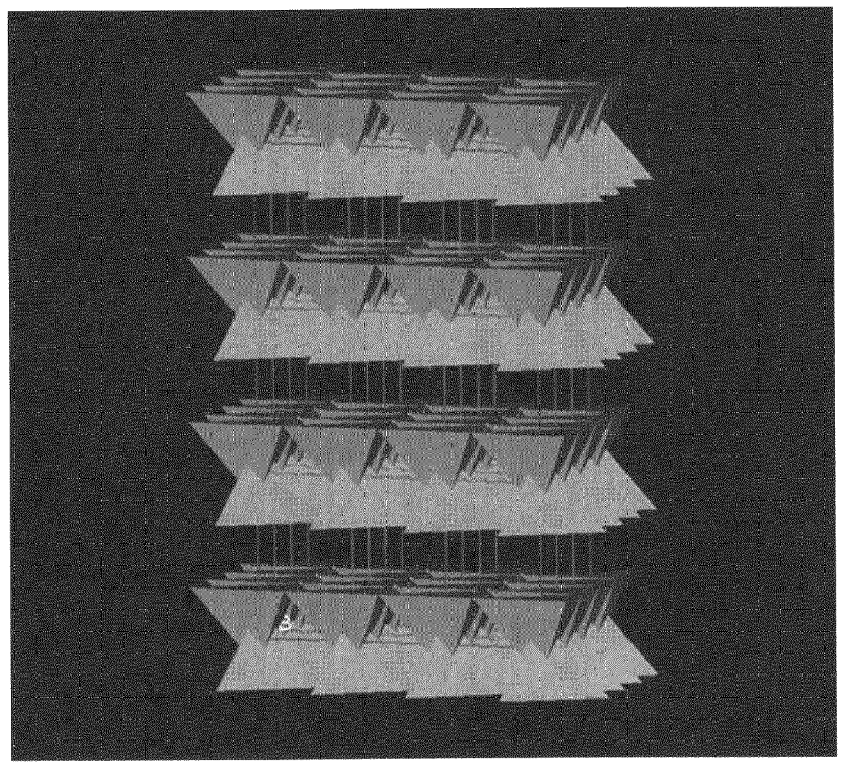
Figure 8:
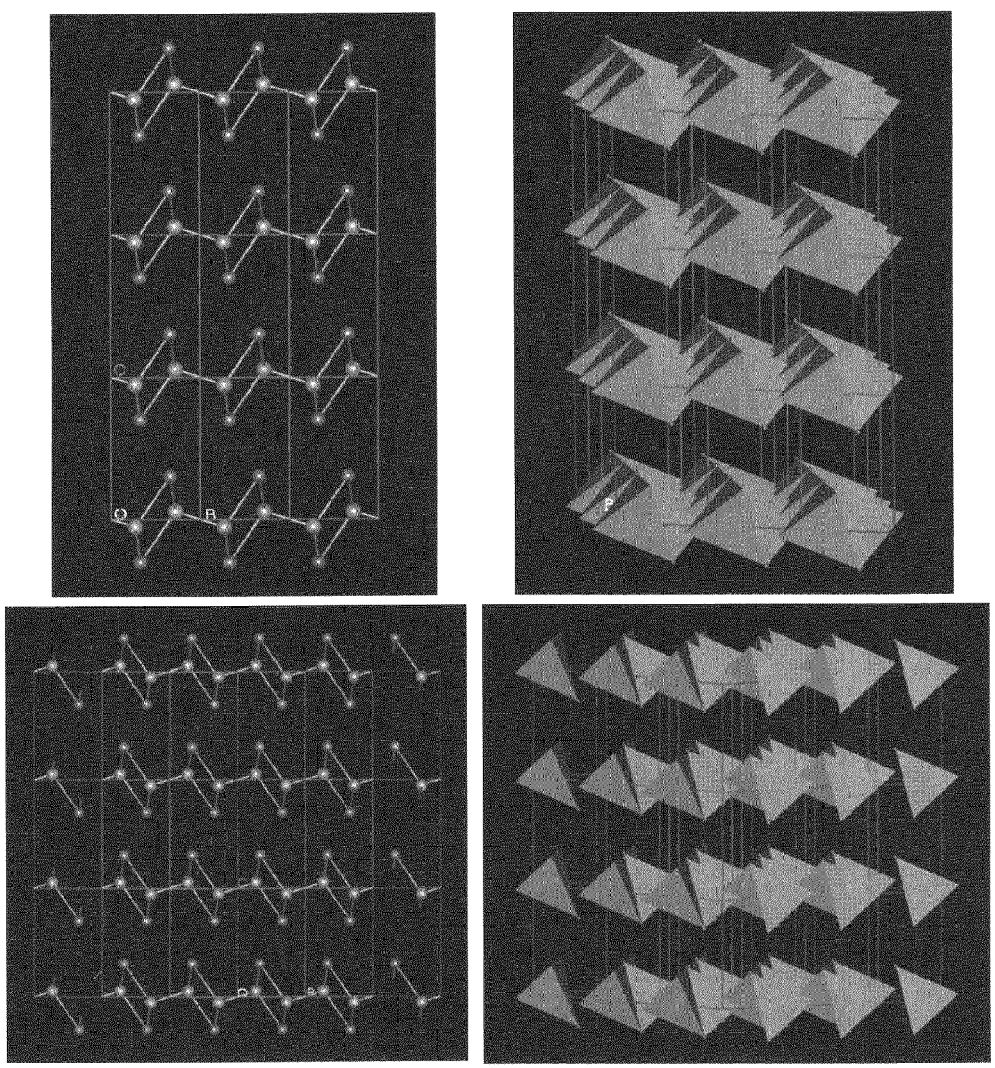
FIG. 8 shows the crystal structure of $SnP_{0.94}$ having a polymeric network of Sn and P2 atoms.

FIG. 3 shows X-ray diffraction patterns of $SnP_{0.94}$ particles for the pristine, the first discharging (0V), the first charging (1.2 V), after 10 and 20 cycles. From the XRD pattern of the pristine, the particles were found to be $SnP_{0.94}$ crystals, and it can be seen that the crystal structure of tin phosphide has a two-dimensional layered-like structure (see Table 1 above). The tin atoms are hexagonally packed in the unit cell and closely linked with two kinds of diphosphorus atomic pairs, P(1)-P(1) and P(2)-P(2). The layered $SnP_{0.94}$ slab consist of a polymeric network of —[Sn—P—P—Sn]— that exhibits zigzag bonding (see FIGS. 6 to 8).

XRD patterns during the first discharge-charge process closely resembled to that of the pristine. These patterns suggest that $SnP_{0.94}$ maintains constant lattice parameters under electrochemical reactions, and no significant phase transition from the layered structure to other crystal structures or phases occurs. Also, no overall variation of the XRD patterns was observed, even after 10 and 20 cycles.

Meanwhile, it should be noted that the original structure was maintained after continuous cycling. From such results, it is thought that, in the case of the anode active material of the present invention, the electrochemical aspect of charge compensation for the Li ion behavior is different from that of $Sn_3P_4$ and $MP_n$ anodes (M=Mn, Co, Fe, Cu or V), in which Li ion insertion leads to reduction of the metal below 0.5V.

The XRD results demonstrate that the charge compensation by Li ion insertion occurs in the short-range-ordered structure around Sn, and does not cause the variation of the bulk lattice structure of layered $SnP_{0.94}$.

For more detailed local structural analysis, comparative X-ray absorption spectroscopic study can be introduced since it is sensitive to structural change under molecular level.

Figure 4:
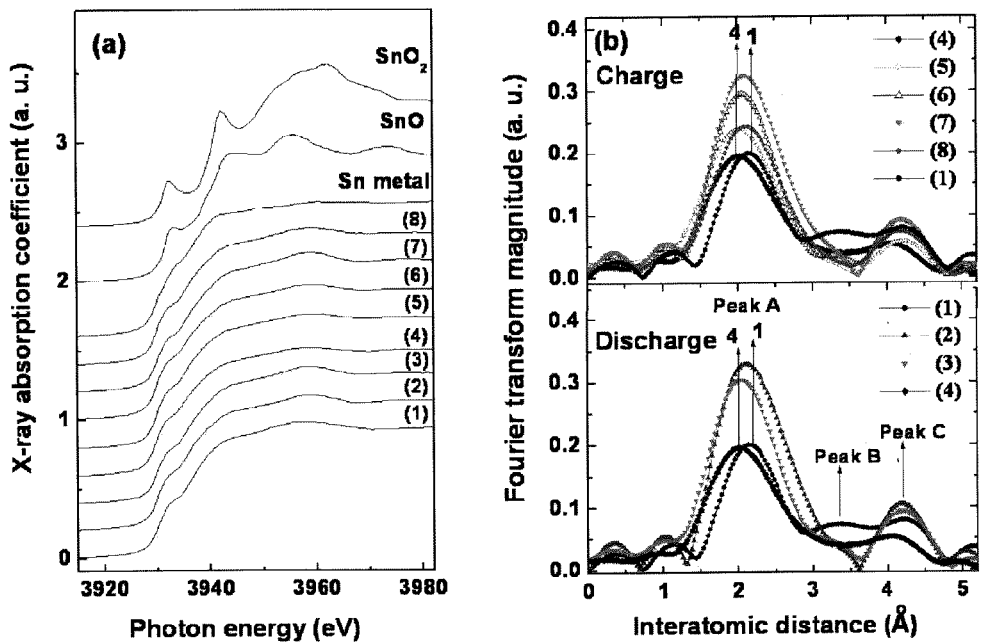
FIG. 4(a) shows normalized Sn $L_{III}$-edge XANES (X-ray absorption near edge structure) spectra.
FIG. 4(b) shows Fourier transform magnitudes of $k^2$-weighted Sn $L_{III}$-edge EXAFS spectra, corresponding to said Sn $L_{III}$-edge XANES spectra, in the first cycle.
Figure 5:
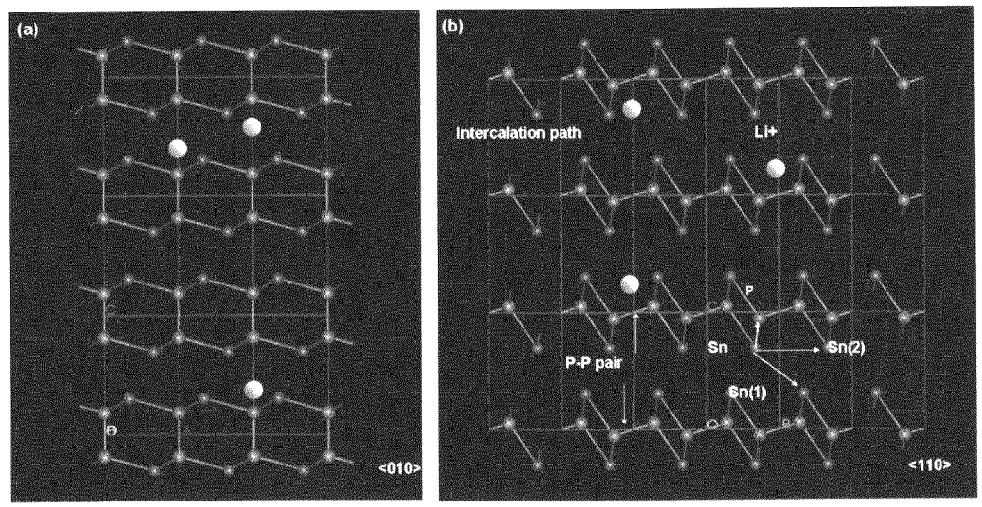
FIG. 5 shows a possible intercalating path from $SnP_{0.94}$ crystal structures, which consist of (a) Sn—P1 (2c site) and (b) Sn—P2 (6i site) atomic pairs under the space group of P-3 m1.

FIG. 4 shows normalized Sn $L_{III}$-edge XANES spectra and their corresponding Fourier transform (FT) magnitudes of k2-weighted Sn $L_{III}$-edge EXAFS spectra. As can be seen in FIG. 4(a), the XANES peak feature of $SnP_{0.94}$ is very similar to that of the Sn metallic state, suggesting that the overall valence state of the Sn ion is lower than a divalent or tetravalent state.

The abnormal lower valence of Sn is due to the very small electronegativity difference between tin and phosphorous atoms, and this is because the Pauling constants of tin and phosphorus atoms are 1.96 and 2.19 Pauling units, respectively.

Accordingly, the chemical bonding leads to a flexible polymeric network having a layered crystal structure. During the charge/discharge process ((1) to (8) in FIG. 3a), there was no distinct XANES spectral change in the $SnP_{0.94}$ particles as shown in FIG. 4(a).

Compared to the previously reported $Sn_4P_3$ material, the XANES spectra of the $Sn_4P_3$ exhibit peak feature variations during the charge/discharge process and is not reversible after one cycle, suggesting that the initial electronic state of Sn and the local structure of $Sn_4P_3$ have been changed effectively.

Thus, the constant XANES feature on the Li ion behavior in $SnP_{0.94}$ suggests that there is no visible change in the Sn oxidation state in the electrochemical reaction for 4.5 mole $Li^=$ ion insertion/extraction ($SnP_{0.94}+4.5Li \leftrightarrow Li_{4.5}SnP_{0.94}$).

On the other hand, the FT peak feature of $k^2$-weighted Sn $L_{III}$-edge EXAFS spectra shows a variation in Li ion behavior (FIG. 4b). This means that the local structural variation around the Sn atoms is part of the charge compensation process. Pristine $SnP_{0.94}$ shows three distinct kinds of FT peaks: Sn—P bonding at 2.1 Å (peak A), direct Sn—Sn(1) metallic bonding at about 3.2 Å (peak B), and Sn—P—P—Sn(2) bonding at 4.0 Å (peak C).

Figure 9:
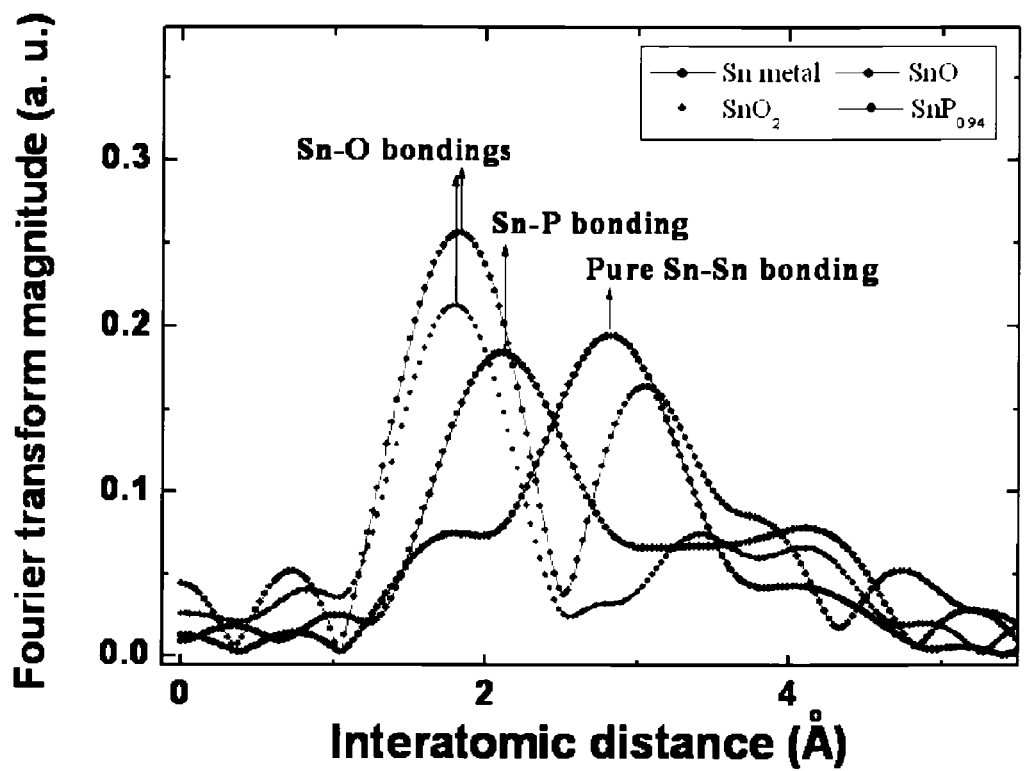
FIG. 9 shows Fourier Transform magnitudes of $k^2$-weighted Sn $L_{III}$-edge EXAFS spectra without calibration of phase shift. For clear comparison, the Fourier Transform magnitudes of SnO and $SnO_2$ were reduced to suitable ratios of 1/2 and 1/4, respectively.

Peak B corresponds to Sn—Sn bonding between the interlayers of $SnP_{0.94}$ slabs, but not closely packed Sn atoms. On the other hand, pure Sn metal gives an FT peak of Sn—Sn metallic bonding at about 2.9 Å (see FIG. 9).

Peak C is associated with the formation of a polymeric network by extended —[Sn—P—P—Sn]— bonding in a layer. On discharging, peak A starts to shift gradually to a lower r space, suggesting that the Sn—P length is reduced.

On discharging to 0.0 V, the average Sn—P bond distance (peak A) is reduced by about 0.15 Å compared to before discharging.

The peak B abruptly disappears, which can be a spectral probe giving Li-ion intercalating path. The absence of peak B during Li ion insertion might be due to the fact that the Sn—Sn scattering between $SnP_{0.94}$ polymeric slabs is effectively shielded by the interference of Li ions. The Li ion positioned in the interlayer can lead to local structural modification around the central Sn atom and prevent the scattering interaction between the central Sn atom and neighboring Sn1 atom. Thus, this spectral feature strongly suggests that Li ions are located in the interstitial sites between the polymeric slabs. This fact is supported by an earlier report, in which the initial Li ion insertion begins to bind at the center of the P—P bond.

On the other hand, the peak C of Sn—P—Sn bonding shows no change, suggesting that the polymeric —[Sn—P—P—Sn]— slabs are not broken, in spite of Li ion insertion.

The peak feature variations are closely related to effective local structural change around the Sn atom. It is evident that at first the $Li^+$ ion is intercalated in the intermolecular channel between the $SnP_{0.94}$ slabs. More Li ion insertion gives rise to $Li^+$ ion binding at the diphosphorus (P—P) center. The Li ion located at the interstitial site leads to the formation of Li—P bonding, which is related to partial P—P bond cleavage. The local structural variation, along with the Li ion behavior, makes edge-shared Sn—P bonding shrink along the z-axis, and also causes static disorder of the Sn—Sn(1) interlayer interaction. Thus, it is considered that the FT intensity variation of peak A is associated with the effect of the Li ion content on the relative short-range order of Sn—P bonding.

Many prior reports for similar anodic systems show metallization of the metal part of compounds for the charge compensation during Li ion insertion. For example, the layered structure of the $Sn_4P_3$ anode material is destroyed, and the phase is converted into LiP and $Li_xSn$ alloys as a result of Li insertion, leading to a sharp decrease in capacity in the high-voltage region above 0.9 V (0 mAh/g after 40 cycles).

In the case of the anode active material of the present invention, no reduction of Sn to the metallic state and —[Sn—P—P—Sn]— polymeric network was observed even in the fully discharged state. Although Li ion insertion leads to Li—P bonding, there always exists a phosphorus atom directly bonded to Sn. Accordingly, it is evident that the existence of a diphosphorus pair prevents metallization of tin phosphide in the intercalation mechanism.

On charging to 1.2V, the FT peak features return reversibly to those of the pristine particle through schematic variation of the discharging process. Thus, it is considered that the excess positive charge by the 4.5 mole $Li^+$ ion intercalation can be compensated for by local structural variation around the tin ion within the Sn—P—P—Sn slabs, rather than a change in the oxidation state of Sn.

In conclusion, good electrochemical cycling characteristics could result from structural reversibility by a lithium intercalation/deintercalation mechanism through molecular channels, without a phase transition from $SnP_{0.94}$ to the metallic alloy $Li_xSn$.

The inventive anode active material had a reversible capacity two times as large as that of a graphite anode, together with low irreversible capacity and low working voltage, suggesting that it would be used as an anode material for next-generation high-capacity lithium secondary batteries.

Comparative Example 1

The preparation and analysis of powder were carried out in the same manner as in Example 1, except that, in the synthesis of $SnP_{0.94}$, 0.36 g of tin acetate was mixed with 10 ml of TOP without adding TOPO.

In the case where TOPO was not added, the resulting particles had a very irregular shape rather than a teardrop shape.

Comparative Example 2

$Sn_4P_3$ was synthesized by ball milling Sn metal and P at a mole ratio of 4:3 for 24 hours at 1000 rpm. The resulting particles showed an initial charge capacity of about 900 mAh/g (0V-1.2V), but showed a capacity retention of 5% after 30 cycles.

INDUSTRIAL APPLICABILITY

As can be seen from the foregoing, according to the present invention, the teardrop-shaped single-crystal $SnP_{0.94}$ particles are applied as an anode active material for lithium secondary batteries. The anode active material can provide an anode having very excellent cycling properties because it has a reversible capacity, which is about two times as large as that of a carbon anode, along with a very low irreversible capacity, and it is structurally very stable against Li ion intercalation/deintercalation in a charge/discharge process, indicating little or no change in the volume thereof.

The invention claimed is:

1. A negative electrode active material having a composition of $SnP_x$, wherein x is 0.94, and the active material particles are monocrystalline.

2. The negative electrode active material according to claim 1, which is obtained by selective anisotropic growth of crystals along the c-axis of a hexagonal crystal lattice.

3. The negative electrode active material according to claim 1, wherein the active material particles are teardrop-shaped and have a length of 100 nm to 1 μm and an aspect ratio (long-axis length/short-axis length) of 1.0-10.0.

4. The negative electrode active material according to claim 3, wherein the long-axis connecting the tail portion with the head portion of the teardrop shape is the c-axis of a hexagonal crystal lattice.

5. The negative electrode active material according to claim 1, wherein the electrode active material has a hexagonal layered crystal structure, in which tin atoms are hexagonally packed in the unit cell and closely linked with two kinds of diphosphorus atomic pairs, and the layered slab consists of a polymeric network of —[Sn—P—P—Sn]— that exhibits zigzag bonding.

6. The negative electrode active material according to claim 1, which undergoes reversible lithium intercalation/deintercalation in a charge/discharge process.

7. The negative electrode active material according to claim 1, wherein the crystal structure of the active material is not changed, even by lithium intercalation/deintercalation.

8. The negative electrode active material according to claim 1, wherein the oxidation state of Sn is not changed, even by the reversible intercalation/deintercalation of lithium, and charge compensation occurs due to local structural variation around Sn ions.

9. The negative electrode active material according to claim 1, wherein lithium is located in the interstitial sites of the crystal lattice.

10. The negative electrode active material according to claim 1, which has a capacity of 600-900 mAh/g between 0V and 1.2V.

11. The negative electrode active material according to claim 1, which has a capacity retention of more than 90% after 40 cycles.

12. The negative electrode active material according to claim 1, which has a Coulombic efficiency of more than 80% in the first charge/discharge cycle.

13. An electrode comprising a negative electrode active material as defined in claim 1.

14. A lithium secondary battery comprising an electrode as defined in claim 13.

15. A method for preparing a negative electrode active material having a composition of $Snp_x$, wherein $0.9 \leq x \leq 0.98$ comprising the steps of: preparing a mixed solution of a Sn precursor, trioctyl phosphine (TOP) and trioctyl phosphine oxide (TOPO); and heating the solution.

16. The method according to claim 15, wherein the Sn precursor is Sn acetate.

* * * * *

UNITED STATES PATENT AND TRADEMARK OFFICE
CERTIFICATE OF CORRECTION

PATENT NO. : 8,067,116 B2  
APPLICATION NO. : 12/310602  
DATED : November 29, 2011  
INVENTOR(S) : Ki-Tae Kim et al.

Page 1 of 1

It is certified that error appears in the above-identified patent and that said Letters Patent is hereby corrected as shown below:

On the Title page of the Patent under Abstract (57), line 7, "a Sn precursor" should read --an Sn precursor--.

In the Specifications:
Column 3, line 46, "is" should read --are--.
Column 6, line 62, "shows" should read --show--.
Column 7, line 44, delete "to" after "resembled".
Column 8, line 16, "is" should read --are--.

In the Claims:
Column 10, line 55, "Snp" should read --SnP--.

Signed and Sealed this
Ninth Day of July, 2013

Teresa Stanek Rea
*Acting Director of the United States Patent and Trademark Office*